US012794039B2

(12) United States Patent
Pytlik et al.

(10) Patent No.: US 12,794,039 B2
(45) Date of Patent: Nov. 10, 2026

(54) ENERGY STORAGE CELL

(71) Applicant: VARTA Microbattery GmbH, Ellwangen Jagst (DE)

(72) Inventors: Edward Pytlik, Ellwangen (DE); David Ensling, Ellwangen (DE)

(73) Assignee: VARTA MICROBATTERY GMBH, Ellwangen Jagst (DE)

( * ) Notice: Subject to any disclaimer, the term of this patent is extended or adjusted under 35 U.S.C. 154(b) by 903 days.

(21) Appl. No.: 18/246,198

(22) PCT Filed: Sep. 14, 2021

(86) PCT No.: PCT/EP2021/075183
§ 371 (c)(1),
(2) Date: May 25, 2023

(87) PCT Pub. No.: WO2022/063632
PCT Pub. Date: Mar. 31, 2022

(65) Prior Publication Data

US 2023/0352765 A1 Nov. 2, 2023

(30) Foreign Application Priority Data

Sep. 22, 2020 (EP) .................................... 20197610

(51) Int. Cl.
*H01M 10/6563* (2014.01)
*H01M 10/0587* (2010.01)
(Continued)

(52) U.S. Cl.
CPC ... *H01M 10/6554* (2015.04); *H01M 10/0587* (2013.01); *H01M 10/61* (2015.04);
(Continued)

(58) Field of Classification Search
CPC ......... H01M 10/6554; H01M 10/0587; H01M 10/61; H01M 10/6561; H01M 10/6567;
(Continued)

(56) References Cited

U.S. PATENT DOCUMENTS

| | | | | |
|---|---|---|---|---|
| 5,501,916 A * | 3/1996 | Teramoto .......... | H01M 10/6555 429/94 |
| 9,837,647 B2 | 12/2017 | Schmidt et al. | |

(Continued)

FOREIGN PATENT DOCUMENTS

| | | |
|---|---|---|
| DE | 102006047926 A1 | 4/2008 |
| DE | 102007024869 A1 | 12/2008 |

(Continued)

OTHER PUBLICATIONS

International Organization for Standardization, "ISO 7806-1983", Dec. 1, 1983, pp. 1-8, Switzerland.

(Continued)

*Primary Examiner* — Christian Roldan
(74) *Attorney, Agent, or Firm* — Leydig, Voit & Mayer, Ltd.

(57) ABSTRACT

The invention relates to an energy storage cell (100) in the form of a cylindrical round cell having an outside diameter of al least 30 mm, comprising an electrode-separator composite (104) having the following sequence: anode, separator, cathode. The electrode-separator composite (104) is in the form of a hollow cylindrical winding having two terminal end faces and having a winding casing lying therebetween. The energy storage cell comprises a housing, which surrounds a hollow cylindrical interior. In the interior of the housing, the electrode-separator composite (104) in the form of a winding is oriented axially In order to delimit the interior, the housing comprises: —a first annular closure
(Continued)

element (1010), which has an outside diameter and an inside diameter; —a second annular closure element (1020), which has an outside diameter and au inside diameter; —a first tubular housing part (1030), which has two terminal circular openings, the diameter of the first tubular housing part (1030) being matched to the outside diameter of the first annular closure element (1010) and of the second annular closure element (1020); and —a second tubular housing part (1040), which has two terminal circular openings, the diameter of the second tubular housing part (1040) being matched to the inside diameter of the first annular closure element (1010) and of the second annular closure element (1020). The strip-shaped electrodes of the electrode-separator composite are contacted by means of the longitudinal edges of the electrodes, which protrude from the terminal end faces of the hollow cylindrical winding. The energy storage cell comprises an at least partially metal contact element, which is in direct contact with one of the longitudinal edges and is connected to said longitudinal edge preferably by means of welding. The first or the second annular closure element (1010, 1020) acts as the contact element. The second tubular housing part (1040) of the housing defines a channel (1500), which is open at both ends and runs axially through the energy storage cell.

15 Claims, 5 Drawing Sheets

(51) Int. Cl.

| | |
|---|---|
| ***H01M 10/61*** | (2014.01) |
| ***H01M 10/6554*** | (2014.01) |
| ***H01M 10/6561*** | (2014.01) |
| ***H01M 10/6566*** | (2014.01) |
| ***H01M 10/6567*** | (2014.01) |
| ***H01M 10/6568*** | (2014.01) |
| ***H01M 50/107*** | (2021.01) |
| ***H01M 50/183*** | (2021.01) |
| *H01M 10/0525* | (2010.01) |

(52) U.S. Cl.
CPC ... *H01M 10/6561* (2015.04); *H01M 10/6567* (2015.04); *H01M 50/107* (2021.01); *H01M 50/183* (2021.01); *H01M 10/0525* (2013.01)

(58) Field of Classification Search
CPC ............. H01M 50/107; H01M 50/183; H01M 10/0525; H01M 10/6563; H01M 10/6566; H01M 10/6568; H01M 50/152; H01M 50/213; H01M 50/548; H01M 50/559; H01M 50/562; H01M 10/653; Y02E 60/10; Y02P 70/50
See application file for complete search history.

(56) References Cited

U.S. PATENT DOCUMENTS

| | | | | |
|---|---|---|---|---|
| 10,930,899 | B2 | 2/2021 | Kreidler et al. | |
| 11,038,218 | B2 | 6/2021 | Gilbert et al. | |
| 2012/0015224 | A1* | 1/2012 | Pytlik | H01M 6/10 429/185 |
| 2014/0220399 | A1 | 8/2014 | Ebert et al. | |
| 2017/0187008 | A1* | 6/2017 | Gaugler | H01M 50/56 |
| 2019/0165335 | A1* | 5/2019 | Kreidler | H01M 10/0431 |

FOREIGN PATENT DOCUMENTS

| | | | |
|---|---|---|---|
| DE | 102008042587 | A1 | 4/2010 |
| DE | 102011010664 | A1 | 8/2012 |
| DE | 102011105040 | A1 | 11/2012 |
| DE | 102014201165 | A1 | 8/2015 |
| DE | 102014112628 | A1 | 3/2016 |
| DE | 102017108722 | A1 | 11/2017 |
| DE | 102019001520 | B3 | 2/2020 |
| EP | 3276701 | A1 | 1/2018 |
| JP | H11-329514 | A | 11/1999 |
| JP | 2001-093566 | A | 4/2001 |
| JP | 2004-119330 | A | 4/2004 |
| WO | WO 2013/023847 | A1 | 2/2013 |
| WO | WO 2017/215900 | A1 | 12/2017 |

OTHER PUBLICATIONS

Deutsches Institut Für Normung E.V., "DIN EN ISO 527 Part 3," Feb. 2019, pp. 1-13, Germany.
International Electrotechnical Commission, "IEC/EN 61951-1," Feb. 2023, pp. 1-9, Switzerland.
International Electrotechnical Commission, "IEC/EN 60622," Oct. 2002, pp. 1-18, Switzerland.
International Electrotechnical Commission, "IEC/EN 61951-2," Mar. 2017, pp. 1-48, Switzerland.
International Electrotechnical Commission, "IEC/EN 61960," Feb. 2017, pp. 1-50, Switzerland.
International Electrotechnical Commission, "IEC/EN 61056-1," Feb. 2012, pp. 1-23, Switzerland.

* cited by examiner

ENERGY STORAGE CELL

CROSS REFERENCE TO RELATED APPLICATIONS

This application is a U.S. National Phase application under 35 U.S.C. § 371 of International Application No. PCT/EP2021/075183, filed on Sep. 14, 2021, and claims benefit to European Patent Application No. EP 20197610.7, filed on Sep. 22, 2020. The International Application was published in German on Mar. 31, 2022 as WO 2022/063632 under PCT Article 21(2).

FIELD

The present disclosure relates to an energy storage cell having an electrode-separator assembly in the form of a hollow cylindrical winding, a battery having a plurality of such energy storage cells, and a method of manufacturing such energy storage cells.

BACKGROUND

Electrochemical cells can convert stored chemical energy into electrical energy by virtue of a redox-reaction. They generally comprise a positive and a negative electrode separated by a separator. During a discharge, electrons are released at the negative electrode as a result of an oxidation process. This results in an electron current that can be drawn off by an external electrical consumer, for which the electrochemical cell serves as an energy supplier. At the same time, an ion current corresponding to the electrode reaction occurs within the cell. This ion current crosses the separator and is made possible by an ion-conducting electrolyte.

If the discharge is reversible, i.e. if it is possible to reverse the conversion of chemical energy into electrical energy that took place during the discharge and thus to charge the cell again, this is said to be a secondary cell. The designation of the negative electrode as anode and the designation of the positive electrode as cathode, which is generally used for secondary cells, refers to the discharge function of the electrochemical cell.

Secondary lithium-ion cells are used for many applications today because these cells can provide high currents and are characterized by a comparatively high energy density. They are based on the use of lithium, which can migrate between the electrodes of the cell in the form of ions. The negative electrode and the positive electrode of a lithium-ion cell are generally formed by so-called composite electrodes, which comprise electrochemically active components as well as electrochemically inactive components.

In principle, all materials that can absorb and release lithium ions can be used as electrochemically active components (active materials) for secondary lithium-ion cells. Carbon-based particles, in particular graphitic carbon, are often used for the negative electrode. Other non-graphitic carbon materials capable of intercalating lithium can also be used. In addition, metallic and semi-metallic materials that are alloyable with lithium can also be used. For example, the elements tin, aluminum, antimony and silicon can form intermetallic phases with lithium. For example, lithium cobalt oxide ($LiCoO_2$), lithium manganese oxide ($LiMn_2O_4$), lithium iron phosphate ($LiFePO_4$) or derivatives thereof can be used as active materials for the positive electrode. The electrochemically active materials are generally contained in particle form in the electrodes.

As electrochemically inactive components, the composite electrodes generally comprise a flat and/or strip-shaped current collector, for example a metallic foil, which serves as a carrier for the respective active material. The current collector for the negative electrode (anode current collector) may be formed of copper or nickel, for example, and the current collector for the positive electrode (cathode current collector) may be formed of aluminum, for example. Furthermore, the electrodes may comprise an electrode binder (e.g., polyvinylidene fluoride (PVDF) or another polymer, for example, carboxymethyl cellulose), conductivity-enhancing additives, and other additives as electrochemically inactive components. The electrode binder ensures the mechanical stability of the electrodes and often the adhesion of the active material to the current collectors.

As electrolytes, lithium-ion cells generally comprise solutions of lithium salts such as lithium hexafluorophosphate ($LiPF_6$) in organic solvents (e.g., ethers and esters of carbonic acid).

In the manufacture of a lithium-ion cell, the composite electrodes are combined with one or more separators to form an assembly. In this process, the electrodes and separators are usually joined together under pressure, if necessary also by lamination or by bonding. The basic functionality of the cell can then be established by impregnating the assembly with the electrolyte.

In many embodiments, the assembly is formed as a winding or made into a winding. Generally, it comprises the sequence positive electrode/separator/negative electrode. Often, assemblies are made as so-called bi-cells with the possible sequences negative electrode/separator/positive electrode/separator/negative electrode or positive electrode/separator/negative electrode/separator/positive electrode.

For applications in the automotive sector, for e-bikes or also for other applications with high energy requirements, such as in tools, lithium-ion cells with the highest possible energy density are needed that are simultaneously able to be loaded with high currents during charging and discharging.

Cells for the applications mentioned are often designed as cylindrical round cells, for example with the form factor 21×70 (diameter*height in mm). Cells of this type comprise an assembly in the form of a winding. Modern lithium-ion cells of this form factor can already achieve an energy density of up to 270 Wh/kg. However, this energy density is only considered an intermediate step. The market is already demanding cells with even higher energy densities.

When developing improved electrochemical cells, however, there are other factors to consider than just energy density. Extremely important parameters are also the internal resistance of the cells, which should be kept as low as possible to reduce power losses during charging and discharging, and the thermal connection of the electrodes, which can be essential for temperature regulation of the cell. These parameters are also very important for cylindrical round cells that contain a composite assembly in the form of a winding. During charging and discharging of cells, heat accumulation can occur in the cells due to power losses, which can lead to massive thermomechanical and electrochemical stresses and consequently to deformation and damage of the cell structure and cell chemistry. The risk consists of increased risk if the electrical connection of the current collectors is made via separate electrical conductor tabs welded to the current collectors, which protrude axially from wound assemblies, as heating can occur locally at these conductor tabs and in adjacent electrode areas during heavy loads during charging or discharging. Heat dissipation from the electrode composite can only occur very poorly via these thermal bottlenecks. Heat buildup can occur in the core of the electrode composite/winding in particular. Thus, the thermal behavior of the cell is decisive for many applications—in addition to the level of thermal losses, the ability to dissipate heat also plays a key role.

WO 2017/215900 A1 describes cells in which the electrode-separator assembly and its electrodes are ribbon-shaped and are in the form of a winding. The electrodes each have current collectors loaded with electrode material. Oppositely poled electrodes are arranged offset to each other within the electrode-separator assembly so that longitudinal edges of the current collectors of the positive electrodes protrude from the winding on one side and longitudinal edges of the current collectors of the negative electrodes protrude from the winding on another side. For electrical contacting of the current collectors, the cell has at least one contact element which rests on one of the longitudinal edges in such a way that a line-shaped contact zone is formed. The contact element is connected to the longitudinal edge along the line-shaped contact zone by welding. This makes it possible to electrically contact the current collector and thus also the associated electrode over his/her entire length. This significantly reduces the internal resistance within the cell described. The occurrence of large currents can subsequently be absorbed much better. Also, the thermal conductivities in the axial and radial directions sometimes differ significantly. Heat conduction in the axial direction is already significantly improved by means of end-face contacted arrester plates. This enables more effective coupling of the cooling power via the poles. Nevertheless, it remains difficult to dissipate the heat from the cell core, and the heat capacity increases in particular with larger cells. The efficiency of the coupling of cooling power is therefore very important.

At low temperatures, the possibility of temperature control/heating of cells is also important, for example to enable charging of the cell at sub-zero temperatures. Of course, analogous considerations apply here.

In order to prevent or at least minimize damage to energy storage cells as a result of the thermomechanical stresses mentioned, a defined operating temperature range should be maintained which ensures safe and gentle operation of the energy storage cells. Therefore, measures for temperature control of energy storage cells generally make sense.

It is known to use coolant circuits to cool energy storage cells of a battery or battery module. For example, cooling or refrigeration plates can be used onto which the battery modules are pressed with their underside for heat dissipation.

Other approaches work with liquid cooling media. DE 102007024869 A1, for example, describes a battery module for electrical appliances in which a cooling medium is passed through the housing of the module.

DE 102014112628 A1 describes a coolable battery module, the battery module having two holding plates arranged at a distance from one another and a plurality of electrical round cells which pass through passages in the holding plates at the ends in a sealed manner. A space interspersed with the electrical cells is formed between the retaining plates and is formed to receive an electrically conductive coolant flowing around the electrical cells. The cell poles located at the ends of the electric cells are arranged outside this space. The coolant is preferably an ethylene-glycol-based coolant.

Air cooling of battery modules is also known. WO 2013/023847 A1 describes a battery module, in particular for motor vehicles, with a battery cell stack of preferably prismatic battery cells, wherein air ducts are located between the battery cells. This is intended to enable adequate cooling of the battery cells by means of an air flow.

DE 102014201165 A1 proposes a battery module comprising a number of electrically interconnected battery cells. The individual battery cells are temperature controlled by an air flow passing through channels extending substantially along the battery cells. The battery cells are housed in individual battery cell compartments of a battery cell holder. The channels through which the cooling air flows are located in the side walls of the battery cell compartments. For a sufficient cooling effect, the material of the battery cell holder must have good heat conduction properties.

Nevertheless, known prior art cooling concepts often deliver unsatisfactory results. Above all, uneven cooling effects can occur in different regions of the battery or battery module, so that individual energy storage cells are cooled to different degrees. In the case of poorly cooled cells, this can have a negative impact on the cycling behavior of the cells and thus on their service life.

Furthermore, with known cooling concepts, the problem arises that the cooling covers outer areas of energy storage cells, but not inner regions. However, this is precisely where heat buildup can occur. This problem is particularly acute in the case of larger cylindrical energy storage cells, in particular cylindrical cells with a diameter of 25 mm or more, especially 30 mm or more.

SUMMARY

In an embodiment, the present disclosure provides an energy storage cell designed as a cylindrical round cell with an outer diameter of at least 30 mm. The energy storage cell includes an electrode-separator assembly in the form of a hollow cylindrical winding with two terminal end faces and a winding shell therebetween. The electrode-separator assembly includes a ribbon-shaped anode, the anode comprising a ribbon-shaped anode current collector having a first longitudinal edge, a second longitudinal edge, a strip-shaped main region loaded with a layer of negative electrode material, and a free edge strip extending along the first longitudinal edge that is not loaded with the electrode material. The electrode-separator assembly further includes a ribbon-shaped cathode, the cathode comprising a ribbon-shaped cathode current collector having a first longitudinal edge, a second longitudinal edge, a strip-shaped main region loaded with a layer of positive electrode material, and a free edge strip extending along the first longitudinal edge that is not loaded with the electrode material. In addition, the electrode-separator assembly includes a separator. The energy storage cell also includes a housing that encloses a hollow cylindrical interior space in which the electrode-separator assembly is axially aligned. The housing includes a first annular closure member having an outer diameter and an inner diameter, a second annular closure member having an outer diameter and an inner diameter, a first tubular housing part having two terminal circular openings, and a second tubular housing part having two terminal circular openings. A diameter of the first tubular housing part is matched to the outer diameters of the first annular closure member and the second annular closure member. The diameter of the second tubular housing part is matched to the inner diameters of the first annular closure member and the second annular closure member. An at least partially metallic contact element is in direct contact with a respective longitudinal edge and connected to the respective longitudinal edge. The respective longitudinal edge is the first longitudinal edge of the anode current collector or the first longitudinal edge of the cathode current collector. The anode and the cathode are formed and/or arranged within the electrode-separator assembly relative to each other such that the first longitudinal edge of the anode current collector protrudes from one of the terminal faces and the first longitudinal edge of the cathode current collector protrudes from the other of the terminal faces. The first or the second annular closure member functions as the contact element. The second tubular housing part defines a channel open at both ends and extending axially through the energy storage cell.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
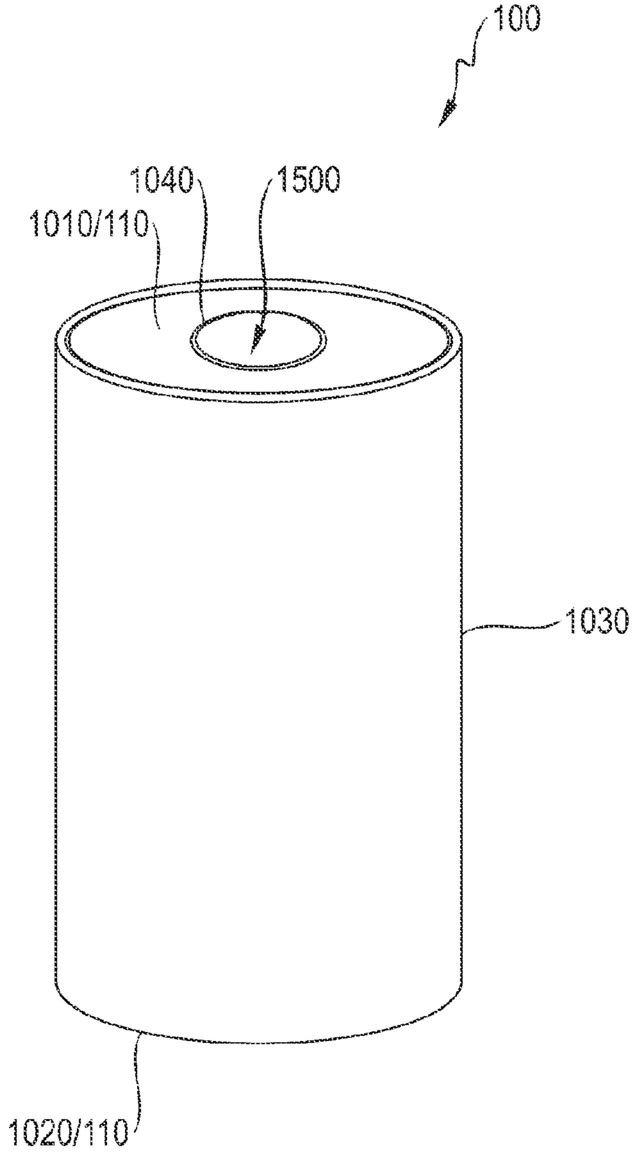
FIG. 1 provides an oblique side view of an energy storage cell according to an embodiment.

The present disclosure provides energy storage cells that are designed to be accessible to cooling even in inner regions. At the same time, however, the energy storage cells should also be characterized by a very good energy density and a homogeneous current distribution, if possible over the entire surface and length of their electrodes. In addition, the energy storage cells should have good properties in terms of their internal resistance and passive heat dissipation capability.

The present disclosure provides a cylindrical energy storage cell and a method of manufacturing such an energy storage cell.

The cylindrical energy storage cell has the immediately following features a. to l:

a. The energy storage cell comprises an electrode-separator assembly with the sequence anode/separator/cathode.
b. The electrode-separator assembly is in the form of a hollow cylindrical winding with two terminal end faces and a winding shell between them.
c. The energy storage cell comprises a housing.
d. The housing encloses a hollow cylindrical interior space.
e. The electrode-separator assembly in the form of a winding is axially aligned in the hollow cylindrical interior space.
f. To delimit the interior space the housing comprises
   a first annular closure member having an outer diameter and an inner diameter,
   a second annular closure member having an outer diameter and an inner diameter,
   a first tubular housing part having two terminal circular openings, the diameter of the first tubular housing part being matched to the outer diameter of the first annular closure member and the second annular closure member, and
   a second tubular housing part having two terminal circular openings, the diameter of the second tubular housing part being matched to the inner diameter of the first annular closure member and the second annular closure member.
g. The anode of the electrode-separator assembly is ribbon-shaped and comprises a ribbon-shaped anode current collector having a first longitudinal edge and a second longitudinal edge.
h. The anode current collector comprises a strip-shaped main region loaded with a layer of negative electrode material and a free edge strip extending along the first longitudinal edge that is not loaded with the electrode material.
i. The cathode of the electrode-separator assembly is ribbon-shaped and comprises a ribbon-shaped cathode current collector having a first longitudinal edge and a second longitudinal edge.
j. The cathode current collector comprises a strip-shaped main region loaded with a layer of positive electrode material and a free edge strip extending along the first longitudinal edge that is not loaded with the electrode material.
k. The anode and the cathode are formed and/or arranged relative to each other within the electrode-separator assembly such that the first longitudinal edge of the anode current collector protrudes from one of the terminal end faces and the first longitudinal edge of the cathode current collector protrudes from the other of the terminal end faces.
l. The energy storage cell comprises a contact element which is at least partially metallic, preferably a contact element which is made entirely of metal or consists exclusively of metallic components, which is in direct contact with one of the first longitudinal edges and which is connected to this longitudinal edge preferably by welding.

Preferred Embodiments of the Electrochemical System

In principle, the present disclosure contemplates energy storage cells regardless of their specific electrochemistries. In preferred embodiments, however, the energy storage cell is a lithium-ion cell, in particular a secondary lithium-ion cell. Basically all electrode materials known for secondary lithium-ion cells can therefore be used for the anode and cathode of the energy storage cell.

In the negative electrode of an energy storage cell designed as a lithium-ion cell, carbon-based particles such as graphitic carbon or non-graphitic carbon materials capable of intercalating lithium, preferably also in particle form, can be used as active materials. Alternatively or additionally, lithium titanate ($Li_4Ti_5O_{12}$) or a derivative thereof or niobium oxide or a derivative thereof may be included in the negative electrode, preferably also in particulate form. Furthermore, the negative electrode may contain as an active material at least one material selected from the group consisting of silicon, aluminum, tin, antimony, or a compound or alloy of these materials capable of reversibly intercalating and deintercalating lithium, for example silicon oxide, optionally in combination with carbon-based active materials. Tin, aluminum, antimony and silicon can form intermetallic phases with lithium. The capacity to absorb lithium exceeds that of graphite or comparable materials many times over, especially in the case of silicon. Thin anodes made of metallic lithium can also be used.

For the positive electrode of an energy storage cell in the form of a lithium-ion cell, lithium metal oxide compounds and lithium metal phosphate compounds such as $LiCoO_2$ and $LiFePO_4$ are suitable active materials. Furthermore, lithium nickel manganese cobalt oxide (NMC) with the chemical formula $LiNi_xMn_yCo_zO_2$ (where x+y+z is typically 1) is particularly well suited, Lithium manganese spinel (LMO) with the chemical formula $LiMn_2O_4$, or lithium nickel cobalt alumina (NCA) with the chemical formula $LiNi_xCo_yAl_zO_2$ (where x+y+z is typically 1). Derivatives thereof, for example lithium nickel manganese cobalt alumina (NMCA) with the chemical formula $Li_{1.11}(Ni_{0.40}Mn_{0.39}Co_{0.16}Al_{0.05})_{0.89}O_2$ or $Li_{1+x}M$-O compounds and/or mixtures of said materials can also be used. The cathodic active materials are also preferably used in particulate form.

In addition, the electrodes of an energy storage cell designed as a lithium-ion cell preferably contain an electrode binder and/or an additive to improve the electrical conductivity. The active materials are preferably embedded in a matrix of the electrode binder, with adjacent particles in the matrix preferably being in direct contact with one another. Conducting agents have the function of elevating the electrical conductivity of the electrodes. Common electrode binders are based, for example, on polyvinylidene fluoride (PVDF), polyacrylate or carboxymethyl cellulose. Common conductive agents are carbon black and metal powder.

The energy storage cell preferably comprises an electrolyte, in the case of a lithium-ion cell in particular an electrolyte based on at least one lithium salt such as lithium hexafluorophosphate ($LiPF_6$), which is present dissolved in an organic solvent (e.g. in a mixture of organic carbonates or a cyclic ether such as THF or a nitrile). Other lithium salts that can be used include lithium tetrafluoroborate ($LiBF_4$), lithium bis(trifluoromethanesulfonyl)imide (LiTFSI), lithium bis(fluorosulfonyl)imide (LiFSI), and lithium bis (oxalato)borate (LiBOB).

Preferred Embodiments of the Separator

The electrode-separator assembly preferably comprises at least one ribbon-shaped separator, more preferably two ribbon-shaped separators, each having a first longitudinal edge and a second longitudinal edge.

Preferably, the separators are formed from electrically insulating plastic films. It is preferred that the separators can be penetrated by the electrolyte. For this purpose, the plastic films used can have micropores, for example. The foil can consist of a polyolefin or a polyetherketone, for example. Nonwovens and fabrics made of plastic materials or other electrically insulating sheet structures can also be used as separators. Preferably, separators are used that have a thickness in the region from 5 μm to 50 μm.

In some embodiments, the separator or separators of the assembly may also be one or more layers of a solid electrolyte.

Preferred Structure of the Electrode-Separator Assembly Formed as a Winding

The ribbon-shaped anode, the ribbon-shaped cathode and the ribbon-shaped separator(s) are preferably wound spirally in the electrode-separator assembly in the form of a winding. To produce the electrode-separator assembly, the ribbon-shaped electrodes are fed together with the ribbon-shaped separator(s) to a winding device, in which they are preferably wound spirally around a winding axis. In some embodiments, the electrodes and the separator are wound for this purpose onto a cylindrical or hollow-cylindrical winding core, which is seated on a winding mandrel and remains in the winding after winding. The winding shell can be formed by a plastic film or an adhesive tape, for example. It is also possible for the winding shell to be formed by one or more separator windings.

It is preferred that the longitudinal edges of the separator(s) form the end faces of the electrode-separator assembly formed as a winding.

It is further preferred that the longitudinal edges of the anode current collector and/or the cathode current collector protruding from the terminal end faces of the winding do not protrude more than 5000 μm, preferably not more than 3500 μm, from the end faces, in particular from the end faces formed by the longitudinal edges of the separator(s).

Preferably, the longitudinal edge of the anode current collector protrudes from the end face of the winding no more than 2500 μm, preferably no more than 1500 μm. Preferably, the longitudinal edge of the cathode current collector protrudes from the end face of the winding no more than 3500 μm, preferably no more than 2500 μm.

Preferably, the ribbon-shaped anode and the ribbon-shaped cathode are offset from each other within the electrode-separator assembly to ensure that the first longitudinal edge of the anode current collector protrudes from one of the terminal end faces and the first longitudinal edge of the cathode current collector protrudes from the other of the terminal end faces.

Preferred Embodiments of the Current Collectors

The current collectors of the energy storage cell have the function of electrically contacting electrochemically active components contained in the respective electrode material over as large an area as possible. Preferably, the current collectors consist of a metal or are at least metallized on the surface. In the case of an energy storage cell designed as a lithium-ion cell, suitable metals for the anode current collector are, for example, copper or nickel or other electrically conductive materials, in particular copper and nickel alloys or metals coated with nickel. Stainless steel is also generally a possibility. In the case of an energy storage cell designed as a lithium-ion cell, aluminum or other electrically conductive materials, including aluminum alloys, are particularly suitable as the metal for the cathode current collector.

Preferably, the anode current collector and/or the cathode current collector is in each case a metal foil with a thickness in the region from 4 μm to 30 μm, in particular a ribbon-shaped metal foil with a thickness in the region from 4 μm to 30 μm.

In addition to foils, however, other ribbon-shaped substrates such as metallic or metallized nonwovens or open-pore metallic foams or expanded metals can be used as current collectors.

The current collectors are preferably loaded on both sides with the respective electrode material.

In some preferred embodiments, the energy storage cell may be characterized by at least one of the features a. to c. immediately below:

a. The strip-shaped main region of the current collector connected to the contact element by welding has a plurality of apertures.
b. The apertures in the main area are round or square holes, especially punched or drilled holes.
c. The current collector connected to the contact element by welding is perforated in the main area, in particular by round hole or slotted hole perforation.

Preferably, the immediately preceding features a. and b. or a. and c., and preferably the three immediately preceding features a. to c., are realized in combination with each other.

The plurality of apertures results in a reduced volume and also in a reduced weight of the current collector. This makes it possible to introduce more active material into the cell and in this way drastically increase the energy density of the cell. Energy density increases up to the double-digit percentage range can be achieved in this way.

In some preferred embodiments, the apertures are introduced into the strip-shaped main region by laser.

In principle, the geometry of the apertures is not essential. What is important is that as a result of the insertion of the apertures, the mass of the current collector is reduced and there is more space for active material, since the apertures can be filled with the active material.

It can be very advantageous to ensure that the maximum diameter of the apertures is not too large when inserting them. Preferably, the dimensions of the apertures should not be more than twice the thickness of the layer of electrode material on the respective current collector.

In preferred embodiments, the energy storage cell is characterized by the feature a. immediately below:

a. The apertures in the current collector, especially in the main region, have diameters in the range from 1 μm to 3000 μm.

Within this preferred region, diameters in the range from 10 μm to 2000 μm, preferably from 10 μm to 1000 μm, preferably from 50 μm to 250 μm, are further preferred.

Preferably, the cell has at least one of the following features immediately below: a. and b:

a. The current collector assembled with the contact element by welding has, at least in a partial section of the main area, a lower weight per unit area than the free edge strip of the same current collector.
b. The current collector connected to the contact element by welding has no or fewer apertures per unit area in the free edge strip than in the main area.

It is preferred that the immediately preceding features a. and b. are realized in combination with each other.

The free edge strips of the anode and cathode current collector bound the main area toward the first longitudinal edges. Preferably, both the anode and cathode current collectors comprise free edge strips along their respective longitudinal edges.

The apertures characterize the main area. In other words, the boundary between the main region and the free edge strip(s) corresponds to a transition between regions with and without apertures.

The apertures are preferably distributed substantially evenly over the main area.

In further preferred embodiments, the cell has at least one of the following features immediately below a. to c.:

a. The weight per unit area of the current collector in the main area is reduced by 5% to 80% compared to the weight per unit area of the current collector in the free edge strip.
b. The current collector has a hole area in the main region in the range from 5% to 80%.
c. The current collector has a tensile strength of 20 N/mm2 to 250 N/mm2 in the main area.

It is preferred that the immediately preceding features a. to c. are realized in combination with each other.

The hole area, often referred to as the free cross-section, can be determined according to ISO 7806-1983. The tensile strength of the current collector in the main area is reduced compared to current collectors without the apertures. Its determination can be done according to DIN EN ISO 527 part 3.

It is preferred that the anode current collector and the cathode current collector are identical or similar in terms of apertures. The respective achievable energy density improvements add up. In preferred embodiments, the cell therefore has at least one of the following features immediately below a. to c.:

a. The strip-shaped main region of the anode current collector and the main region of the cathode current collector are both characterized by a plurality of the apertures.
b. The energy storage cell comprises the contact element, which is connected to one of the first longitudinal edges by welding, as the first contact element, and further comprises a second contact element, which is at least partially, preferably completely, metallic and is connected to the other of the first longitudinal edges by welding.

It is preferred that the immediately preceding features a. and b. are realized in combination with each other.

The preferred embodiments of the current collector provided with the apertures described above are independently applicable to the anode current collector and the cathode current collector.

Temperature Management

In particular, the cell is characterized by the following two features m. and n.:

m. The first and/or second annular closure member of the housing acts as the contact member, and
n. the second tubular housing part defines a channel open on both sides and extending axially through the energy storage cell.

The continuous axial channel preferably runs through the center of the energy storage cell, in particular in such a way that the axis of the hollow cylindrical winding lies in the axial channel.

In a preferred embodiment, the housing of the energy storage cell has a cylindrical shape, with the channel forming a passage extending axially through the housing. In a further development, the housing of the energy storage cell is hollow cylindrical. This is the case if the channel or the second tubular housing part has a circular or at least an oval cross section.

If the second tubular housing part does not have a circular cross-section, the term "inner diameter" refers to its maximum diameter.

It is preferred that the first tubular housing part has a larger diameter than the second tubular housing part and forms an outer housing shell of the cylindrical or hollow cylindrical housing of the energy storage cell, while the second tubular housing part forms an inner housing shell of the cylindrical or hollow cylindrical housing. The annular closure elements thereby form terminal lids of the housing of the energy storage cell.

Preferably, the diameter of the first tubular housing part is matched to the outer diameters of the first annular closure element and the second annular closure element in such a way that a sealing connection is enabled between the terminal openings of the first tubular housing part and the outer edge of the closure elements. For example, one of the outer edges may be fixed in one of the openings by welding or soldering. For example, an electrically insulating seal may be applied to the other of the outer edges, with this cover member being fixed by mechanical means in the other of the openings.

The same applies to matching the diameter of the second tubular housing part with the inner diameter of the first and second annular closure elements.

Preferably, the energy storage cell has the following additional immediately following features a. and b:

a. The energy storage cell comprises two at least partially metallic contact elements, preferably two full metal contact elements, each of which is in direct contact with one of the first longitudinal edges and which are preferably connected to these longitudinal edges by welding.

b. The first and second annular closure elements act as the two contact elements.

In this embodiment, therefore, the first two longitudinal edges are each directly connected to one of the closure elements acting as a contact element, preferably by welding.

In principle, it is possible to connect the longitudinal edges to the contact elements by soldering rather than welding.

In a preferred manner, the energy storage cell has the immediately following additional feature a:

a. The channel open on both sides and running axially through the energy storage cell is set up for temperature control of the energy storage cell.

The contact element not only serves to make electrical contact with one or both electrodes, but also functions as a housing part. This has a major advantage, as a separate electrical conductor between the contact element and a housing part is not required, unlike in conventional energy storage cells. This creates space within the housing and simplifies cell assembly. In addition, direct connection of a housing part to the current collectors of a cell gives this cell very good heat dissipation properties.

At the same time, the channel, which is open on both sides, allows the temperature of the energy storage cell to be controlled from the inside, which permits optimum temperature management, especially in the case of relatively large-format cells, and thus results in maximum performance and a maximum service life for the energy storage cell.

The energy storage cell thus combines the advantages of a cell design in which the current collectors are connected via contact elements that are part of the cell housing with the advantages of being able to implement a particularly effective cooling concept for the energy storage cell. This makes it possible to design energy storage cells larger than conventional energy storage cells. Heat dissipation via the housing surfaces or contact elements is improved both in the axial direction by connecting the end faces of the electrodes as homogeneously as possible and in the radial direction via the additional, internal surface of the hollow cylinder.

The term cooling concept in this context does not necessarily refer exclusively to cooling, but generally to temperature control. As described at the beginning, temperature management is generally advantageous for optimum operation of a battery or battery module that comprises two or more energy storage cells. Here, cooling of the energy storage cells that heat up during operation plays a major role. However, heating may also be useful and necessary, for example, to ensure a required minimum temperature of the energy storage cells for a charging or discharging process. In a particularly advantageous manner, a temperature management system known per se can be used for the operation of the energy storage cells, in which in particular a temperature sensor system can also be used.

In a first principal embodiment, the energy storage cell may—with respect to the realization of a cooling concept—be characterized in particular by the following additional feature a.:

The channel, which is open on both sides, is designed for the flow of a temperature control medium, in particular a gas or a liquid.

In principle, various types of temperature control media are suitable for operating the energy storage cell. In a particularly advantageous manner, flowable temperature control media are used, in particular gases or liquids. Of course, the respective temperature control medium can also be used for cooling or, if necessary, for heating the outer cell envelopes of the energy storage cells.

Particularly suitable, for example, is the use of air as a temperature control medium, whereby the temperature-controlled air can be passed through the energy storage cell in a simple manner for cooling or, if necessary, also for heating. For cooling, for example, ambient air can be used, which is passed through the channel of the energy storage cell, which is open on both sides, by means of a fan or other blowing or suction device.

In other embodiments, a liquid temperature control medium may be used, for example water or another cooling liquid, such as an ethylene glycol-based coolant. In this case, appropriate pumping devices may be provided, with the aid of which the respective liquid is passed through the channel of the energy storage cells, which is open on both sides. The liquid tempering medium can preferably be fed in a circulation system.

According to a second principal embodiment with regard to the cooling concept or the temperature control concept in the energy storage cells, the energy storage cell is characterized in particular by the following additional feature:

a. A metallic rod or tube is inserted into the channel, which is open on both sides, as a tempering agent.

According to this embodiment, the metallic rod or tube, which is located inside the channel open on both sides and thus in the center of the energy storage cell, is used in the sense of a so-called heatpipe. The heatpipe is characterized by particularly good temperature transfer properties and can thus be quickly brought to an elevated or reduced temperature.

In a preferred manner, a metallic tube is used as a heat pipe in the actual sense, which brings about the temperature input by means of an appropriate temperature control medium, whereby the temperature control medium is conducted into and, if necessary, through the heat pipe. In this case, active cooling of the cell takes place by means of the tube.

In other embodiments, a solid metallic rod can also be used, which allows very fast temperature transfer into the interior of the energy storage cell due to good temperature conduction properties. The rod can be tempered outside the channel. For this purpose, the rod can be coupled with appropriate cooling and/or heating means, which can be part of a battery module.

For example, a solid copper rod or a copper tube can be used as a tempering mediator, which is inserted into the channel open on both sides and connected to suitable cooling and/or heating elements.

Preferred Embodiments of the Annular Closure or Contact Elements

According to the disclosure, the first and/or the second annular closure element also serves as a contact element. Or in other words, the contact element is part of the housing of the cell.

Preferably, the first and/or the second annular closure element each have an inner edge defining the inner circumference and an outer edge defining the outer circumference. In preferred embodiments, both edges are circular.

In the simplest case, the first and/or the second annular closure element may be formed by or comprise a metallic annular disc having a central aperture, in particular a central circular hole. The longitudinal edge or edges of the electrode current collectors are preferably connected to these metallic apertured discs by welding or soldering.

In the simplest embodiment, the apertured disk is a metal member with a circular circumference that extends in only one plane. In many cases, however, more elaborate designs may be preferred. For example, the apertured disc may be profiled, such as having one or more depressions and/or elevations around its center, such as circular depressions and/or elevations in a concentric arrangement or linear depressions and/or elevations. Furthermore, the apertured disc can have an edge which is bent radially inwards so that it has a double-layered edge region with, for example, a U-shaped cross-section.

The contact elements or annular closure elements can consist of several individual parts, including the apertured disc, which do not necessarily all have to be made of metal. In a preferred embodiment, the contact element can comprise, for example, a metallic pole cover with a circular circumference, which has approximately or exactly the same diameter as the apertured disc, so that the edge of the apertured disc and the edge of the pole cover together form the edge of the contact element or annular closure element. In a further embodiment, the edge of the pole cover may be enclosed by a radially inwardly bent edge of the metal disk. In preferred embodiments, a clamp connection may exist between the two individual parts. However, both parts may also be connected by welding.

The metal disk and the pole cover preferably enclose an intermediate space. For this purpose, the pole cover preferably has a central curvature. In cells according to the disclosure, the intermediate space is preferably not closed off from the surroundings of the cell. Generally, the pole cover comprises at least one aperture, in particular a central aperture, through which a temperature control medium can enter or protrude from the intermediate space, so that the channel can communicate with the surroundings of the cell via the intermediate space.

In a further embodiment, the first and/or the second annular closure element may comprise a contact sheet metal member having two sides, one of which faces in the direction of the apertured disc and is preferably connected to the apertured disc by welding or soldering. The longitudinal edge or edges of the electrode current collectors emerging from the winding preferably abut directly against the other side of the contact sheet metal member or members and are connected thereto preferably by welding or soldering. Corresponding to the apertured metal disc, the contact sheet metal member also has a preferably central aperture, in particular a central circular hole. In contrast to the previously explained embodiment, the longitudinal edge of the electrode current collector here does not abut directly against the apertured disc but instead abuts directly against the contact sheet metal member. The apertured disc serves to close the housing, while the contact sheet metal member contacts the longitudinal edge of the current collector.

In some preferred embodiments, the contact sheet metal member may have a circular circumference, but this is not mandatory. In some cases, the contact sheet metal member may be a metal strip, for example, or may have a plurality of strip-shaped segments, for example, in a star-shaped arrangement.

Preferably, the contact elements or annular closure elements, and possibly also the contact sheet metal member of the respective contact element or closure element, are dimensioned such that they cover at least 60%, preferably at least 70%, preferably at least 80%, of the respective terminal end face.

Covering the end face over as large an area as possible is important for the thermal management of the cell. The larger the coverage, the more likely it is to contact the longitudinal edge of the respective current collector over its entire length, if possible.

The longitudinal edges of the current collectors may have been subjected to directional or non-directional forming by pretreatment. For example, they can be bent or compressed in a defined direction.

In some embodiments, a contact sheet metal member may be used that includes at least one slot and/or at least one perforation. These can have the function of counteracting deformation of the contact sheet metal member when a welded connection is made to the longitudinal edge of the electrode current collector. This is also intended to ensure that a metered electrolyte can be distributed well and any gases that occur can escape from the interior of the electrode composite.

The side of the contact sheet metal member facing the apertured disc is preferably designed in such a way that, in the event of direct contact between the contact sheet metal member and the apertured disc, there is a two-dimensional contact surface, i.e. the contact sheet metal member and the apertured disc lie flat on top of each other at least in some areas.

In a preferred embodiment, the contact sheet metal member is a flat sheet metal member extending in one plane only; in other embodiments, it may be a profiled sheet metal member. In particular, it is possible that it has one or more ridges or elongated depressions on the side in contact with the longitudinal edge of the electrode current collector. Such ridges or depressions may facilitate the connection to an immediately abutting longitudinal edge.

Preferably, the contact sheet metal member and the apertured disc are in rigid, further preferably in rigid, direct contact with each other. In this case, they are preferably fixed to each other by welding or soldering.

It is preferred that the apertured metal disk and/or the contact sheet metal member be characterized by at least one of the features a. and b. immediately below:

a. The apertured metal disk and/or contact sheet metal member used preferably has a thickness in the region from 50 μm to 600 μm, preferably in the region from 150 μm to 350 μm.
b. The metallic apertured disc and/or the contact sheet metal member consists of alloyed or unalloyed aluminum, alloyed or unalloyed titanium, alloyed or unalloyed nickel, or alloyed or unalloyed copper, but also, if necessary, of stainless steel (for example, of type 1.4303 or 1.4404) or of nickel-plated steel.

It is preferred that the immediately preceding features a. and b. are realized in combination.

If the contact elements comprise both the apertured metal disc and the contact sheet metal member, the contact sheet metal member and the apertured metal disc preferably both consist of the same or at least a chemically related material from a material point of view.

In further embodiments, the outer edge of the first and/or the second annular closure element may be bent, for example, in an L-shape at an angle of 90° to facilitate a connection between the annular closure element and the first (outer) tubular housing part. In a corresponding manner, comparable embodiments may be provided in the region of the inner edge of the first and/or second annular closure element to facilitate connection between the second (inner) tubular housing part and the annular first and/or second closure element in the region.

Housing

Preferably, the housing of the energy storage cell is not constructed from a housing cup and a lid, as is the case with conventional energy storage cells, but comprises a central hollow cylindrical part formed externally by the first tubular housing part and internally by the second tubular housing part. This central part of the housing is closed on both sides by the annular closure elements, which in a sense form an upper and a lower lid. In terms of production technology, this offers advantages because, unlike housing cups, no deep-drawing dies are required to manufacture the tubular housing parts.

The first and/or the second tubular housing part is or are preferably metallic. In principle, however, they can also consist of electrically insulating materials, for example a plastic.

The first tubular housing part can have a circular edge that is bent radially inward over the outer edge of the annular closure element, in particular the outer edge of the metallic apertured disc. The second (inner) tubular housing part can also have a circular edge that is bent radially outward over the annular closure element's inner edge, in particular the inner edge of the metallic apertured disc. The radial bending of the edges of the closure element is an optional measure which is not absolutely necessary for fixing the annular closure elements, but which can be expedient regardless.

In particular, if the cell is designed as a lithium-ion cell, the choice of material from which the housing cup, the metal disc and/or the contact sheet metal and the closure element or its or their components are made depends on whether the anode or the cathode current collector is connected to the respective housing part. Preferred materials are basically the same materials from which the current collectors themselves are made. Thus, said housing parts may consist of the following materials, for example:

Alloyed or unalloyed aluminum, alloyed or unalloyed titanium, alloyed or unalloyed nickel, alloyed or unalloyed copper, stainless steel (for example type 1.4303 or 1.4404), nickel-plated steel.

Furthermore, the housing and its components may consist of multilayer materials (clad materials), for example comprising a layer of steel and a layer of aluminum or copper. In these cases, the layer of aluminum or the layer of copper forms, for example, the inside of the housing cup or the bottom of the housing cup.

In particular, the first tubular housing part can also consist of a non-metallic material, for example plastic. The electrically insulating properties of the plastic are particularly advantageous.

For example, the thickness of the components of the housing can be in the region from 50 μm to 600 μm, preferably in the region from 150 μm to 350 μm.

Other suitable materials are known to the skilled person.

Closure Variants

In principle, it is possible to install the first and/or the second annular closure element with or without seals. However, a closure exclusively with seals would result in four separate sealing areas, which could lead to problems. It is therefore preferred that a. the first and second annular closure members are arranged such that their outer edges abut the inside of the tubular first housing part along a circumferential contact zone, and
b. the outer edges of the first and second annular closure elements are each connected to the tubular housing part by a circumferential weld seam.

To enable the outer edges of the first and second annular closure elements to abut the inside along the circumferential contact zone, it is preferred that the tubular housing part has a circular cross section at least in the sections where the edges abut. Expediently, these sections can be hollow-cylindrical for this purpose. The inner diameter of the tubular housing part in these sections is correspondingly adapted to the outer diameter of the edges of the closure elements, in particular to the outer diameter of the apertured disc described above.

The welding of the outer and inner edges of the closure elements to the first tubular housing part and the second tubular housing part can be carried out in particular by means of a laser. Alternatively, however, it is also possible to fix the closure elements by soldering or bonding. Bonding is particularly suitable if the tubular housing parts are not metallic but consist of an electrically insulating material such as plastic.

In some preferred assemblies, at least one of the annular closure elements comprises at least one pole pin (optionally also two or more pole pins), which is electrically connected to a contact sheet metal member of one of the closure elements and is/are led out of the housing of the energy storage cell through an aperture in an apertured disc of the same closure element. In this context, the closure element concerned preferably comprises at least one insulating means which electrically insulates the at least one pole pin and/or the contact sheet metal member from the apertured disc.

The pole pin can be fixed to the contact sheet metal member by welding or soldering. It is preferably electrically insulated from the apertured disc by means of an insulating material, which preferably also has a sealing function.

The insulating material can in particular be a conventional plastic seal which is suitably chemically resistant to the electrolytes used in each case. Suitable sealing materials are known to the skilled person in the field of primary and secondary energy storage cells. In alternative preferred embodiments, glasses or ceramic and/or glass-ceramic masses can also be used as insulating materials.

Welding of the Contact Element to One of the First Longitudinal Edges

In the various embodiments of the energy storage element, a longitudinal edge of a current collector is preferably attached to one of the annular closure elements by welding, preferably directly to the apertured metal disc or to the contact sheet metal member of the closure element.

The concept of welding the edges of current collectors with contact elements is already known from WO 2017/215900 A1 or from JP 2004-119330 A. This technology enables particularly high current carrying capacities and low internal resistance. With regard to methods for electrically connecting contact elements, in particular also disc-shaped contact elements, to the edges of current collectors, full reference is therefore made to the contents of WO 2017/215900 A1 and JP 2004-119330 A.

As a result of the contact of one of the first longitudinal edges with the contact element or a component of the contact element, a line-shaped contact zone is produced which, in the case of the spirally wound electrodes, has a spiral shape. Along this linear and preferably spiral contact zone or transversely thereto, a connection of the longitudinal edge to the contact element or to the component of the contact element that is as uniform as possible can be realized by means of suitable welded joints.

Preferred Embodiments of the Electrodes

In the free edge strips, the metal of the respective current collector is preferably free of the respective electrode material. In some preferred embodiments, the metal of the respective current collector is uncovered there so that it is available for electrical contacting, for example by welding to the contact or closure element as mentioned above.

In some further embodiments, however, the metal of the respective current collector in the free edge strips may also be coated, at least in some areas, with a support material that is more thermally resistant than the current collector coated therewith and that is different from the electrode material disposed on the respective current collector.

"Thermally more resistant" in this context is intended to mean that the support material retains its solid state at a temperature at which the metal of the current collector melts. It therefore either has a higher melting point than the metal or it sublimates or decomposes only at a temperature at which the metal has already melted.

The support material which can be used in the context of the present invention can in principle be a metal or a metal alloy, provided that this or these has a higher melting point than the metal from which the surface coated with the support material consists of. In many embodiments, however, the energy storage cell preferably has at least one of the following additional features immediately below a. to d.:

a. The support material is a non-metallic material.
b. The support material is an electrically insulating material.
c. The non-metallic material is a ceramic material, a glass-ceramic material or a glass.
d. The ceramic material is aluminum oxide ($Al_2O_3$), titanium oxide ($TiO_2$), titanium nitride (TiN), titanium aluminum nitride (TiAlN), a silicon oxide, such as silicon dioxide ($SiO_2$), or titanium carbonitride (TiCN).

The support material is preferably formed according to the immediately preceding feature b. and preferably according to the immediately preceding feature d.

The term non-metallic material comprises in particular plastics, glasses and ceramic materials.

The term "electrically insulating material" is to be understood broadly in this context. In principle, it comprises any electrically insulating material, in particular also said plastics.

The term ceramic material is to be understood broadly in this context. In particular, this includes carbides, nitrides, oxides, silicides or mixtures and derivatives of these compounds.

By the term "glass-ceramic material" is meant in particular a material comprising crystalline particles embedded in an amorphous glass phase.

The term "glass" basically means any inorganic glass that satisfies the thermal stability criteria defined above and that is chemically stable to any electrolyte that may be present in the cell.

Preferably, the anode current collector consists of copper or a copper alloy while at the same time the cathode current collector consists of aluminum or an aluminum alloy and the support material is aluminum oxide or titanium oxide.

It may be further preferred that free edge strips of the anode and/or cathode current collector are coated with a strip of the support material.

The main regions, in particular the strip-shaped main regions of the anode current collector and cathode current collector, preferably extend parallel to the respective edges or longitudinal edges of the current collectors. Preferably, the strip-shaped main regions extend over at least 90%, preferably over at least 95%, of the areas of the anode current collector and the cathode current collector.

In some preferred embodiments, the support material is applied immediately adjacent to the preferably strip-shaped main regions in the form of a strip or line, but does not completely cover the free regions, so that immediately along the longitudinal edge the metal of the respective current collector is exposed.

Other Preferred Embodiments of the Energy Storage Cell

The energy storage cell may be a button cell. Button cells are cylindrical in shape and have a height that is less than their diameter. Preferably, the height is in the region from 4 mm to 15 mm. It is further preferred that the button cell has a diameter in the region from 5 mm to 25 mm. Button cells are suitable, for example, for supplying electrical energy to small electronic devices such as watches, hearing aids and wireless headphones.

The nominal capacity of a button cell in the form of a lithium-ion cell is generally up to 1500 mAh. Preferably, the nominal capacity is in the region from 100 mAh to 1000 mAh, preferably in the region from 100 to 800 mAh.

Preferably, however, the energy storage cell is a cylindrical round cell. Cylindrical round cells have a height that is greater than their diameter. They are particularly suitable for the applications mentioned at the beginning with high energy requirements, for example in the automotive sector or for e-bikes or for power tools.

Preferably, the height of energy storage cells designed as round cells is in the region from 15 mm to 150 mm. The diameter of the cylindrical round cells is preferably in the region from 10 mm to 60 mm. Within these regions, form factors of, for example, 18×65 (diameter*height in mm) or 21×70 (diameter*height in mm) or 32×700 (diameter*height in mm) or 32×900 (diameter*height in mm) are preferred. Cylindrical round cells with these form factors are particularly suitable for supplying power to electric drives in motor vehicles.

In a preferred manner, the energy storage cell is characterized by the following additional feature a:

a. The energy storage cell has an outer diameter of at least 25 mm, preferably at least 30 mm, more preferably at least 32 mm.

Preferred form factors for the cylindrical energy storage cell are as follows: 32×75 or 32×91 or 67×172 (diameter*height in mm). The advantages are particularly effective for energy storage cells of such size where temperature management or temperature control capabilities are particularly critical.

The nominal capacity of the cylindrical round cell, designed as a lithium-ion cell, is preferably up to 90000 mAh. With the form factor of 21×70, the cell in one embodiment as a lithium-ion cell preferably has a nominal capacity in the region from 1500 mAh to 7000 mAh, preferably in the region from 3000 to 5500 mAh. With the form factor of 18×65, the cell in one embodiment as a lithium-ion cell preferably has a nominal capacity in the region from 1000 mAh to 5000 mAh, preferably in the region from 2000 to 4000 mAh.

In the European Union, manufacturers are strictly regulated in providing information on the nominal capacities of secondary batteries. For example, information on the nominal capacity of secondary nickel-cadmium batteries must be based on measurements according to the IEC/EN 61951-1 and IEC/EN 60622 standards, information on the nominal capacity of secondary nickel-metal hydride batteries must be based on measurements according to the IEC/EN 61951-2 standard, information on the nominal capacity of secondary lithium batteries must be based on measurements according to the IEC/EN 61960 standard, and information on the nominal capacity of secondary lead-acid batteries must be based on measurements according to the IEC/EN 61056-1 standard. Any information on nominal capacities in the present application is preferably also based on these standards.

The anode current collector, the cathode current collector and the separator are preferably ribbon-shaped in embodiments in which the cell is a cylindrical round cell and preferably have the following dimensions:

A length in the region from 0.5 m to 25 m

A width in the region from 30 mm to 145 mm

In these cases, the free edge strip extending along the first longitudinal edge, which is not loaded with the electrode material, preferably has a width of no more than 5000 μm.

In the case of a cylindrical round cell with the form factor 18×65, the current collectors preferably have a width of 56 mm to 62 mm, preferably 60 mm, and a length of not more than 2 m, preferably not more than 1.5 m.

In the case of a cylindrical round cell with the form factor 21×70, the current collectors preferably have a width of 56 mm to 68 mm, preferably 65 mm, and a length of not more than 3 m, preferably not more than 2.5 m.

In a preferred embodiment, the energy storage cell according is characterized by the following additional feature:

a. The contact element comprises a safety valve via which pressure can escape from the housing if a further pressure threshold is exceeded.

This safety valve can be, for example, a bursting diaphragm, a bursting cross or a similar predetermined rupture point, which can rupture at a defined overpressure in the cell to prevent the cell from exploding.

Preferably, the apertured disc of the contact element can have the safety valve, in particular in the form of a predetermined cracking point.

Further, the present disclosure provides a battery having at least two energy storage cells according to the above description. The battery is further characterized by a device for tempering the energy storage cells via the channels of the energy storage cells, which are open on both sides. The individual energy storage cells may be interconnected in parallel or series in a manner known per se.

In a preferred manner, the energy storage cells of the battery can be arranged within battery modules, whereby the battery modules can be interconnected to form a battery. In a preferred manner, two or more energy storage cells are combined in each case in the form of battery modules, wherein two or more of the battery modules form a battery in a manner known per se. The present disclosure therefore also provides such battery modules.

In a preferred manner, the battery is characterized by the following additional feature:

a. The device for temperature control of the energy storage cells comprises means for introducing a temperature control medium, in particular one of the above-mentioned temperature control media, into the channels of the energy storage cells which are open on both sides.

The temperature control medium can be passed through the individual energy storage cells to enable a temperature exchange in a very effective manner. In this way, cooling of the energy storage cells can be achieved in particular. Furthermore, temperature control in general, i.e. also heating of the energy storage cells, is possible if required.

In the case of a gaseous temperature control medium, the battery is preferably characterized by at least one of the following additional features:

a. The device for temperature control of the energy storage cells comprises means for driving a gaseous temperature control medium, in particular an air flow.

b. The device for temperature control of the energy storage cell comprises means for directing a gaseous temperature control medium, in particular an air flow, through the channels of the energy storage cells, which are open on both sides.

Preferably, the immediately aforementioned features a. and b. are realized in combination with each other.

The means for driving the gaseous temperature control medium may be, for example, a fan or other device for blowing or sucking air or other gas. Such drive means may be provided outside the battery and may accomplish the flow of gas inside the battery through appropriate vents or the like. Further, such drive means may also be disposed within a battery.

In addition or alternatively, steering means can be provided for the targeted steering of the temperature control medium, for example steering plates or steering rails made of plastic, corresponding apertures in battery cell holders or the like, so that the gaseous temperature control medium is directed specifically through the channels open on both sides inside the energy storage cells. In addition, it is also preferable for the temperature control medium to flow around the energy storage cells from the outside.

In embodiments of the battery in which a liquid temperature control medium is provided, the battery is preferably characterized by at least one of the following additional features:

a. The energy storage cell temperature control device comprises pumping means for moving a liquid temperature control medium.

b. The energy storage cell temperature control device comprises means for directing a liquid temperature control medium through the channels of the energy storage cells, which are open on both sides.

Preferably, the above features a. and b. are realized together with each other.

The pumping means can be conventional pumps, for example peristaltic pumps, with which the liquid temperature control medium, for example water or another cooling or temperature control medium, can be passed through the interior of the battery and in particular through the channels of the energy storage cells, which are open on both sides. These pumping means can be arranged inside the battery or, preferably, outside the battery, whereby in the case of an arrangement outside the battery corresponding supply lines and discharge lines for the liquid temperature control medium into and out of the battery are provided.

In addition or alternatively, steering means can be provided inside the battery for the liquid temperature control medium, by means of which the liquid temperature control medium is directed through the channels of the energy storage cells, which are open on both sides. For this purpose, for example, metal rails or rails made of plastic or lines made of plastic or suitable openings in cell holders or the like can be provided within the battery. In addition, it is also preferable for the temperature control medium to flow around the energy storage cells from the outside.

In another preferred embodiment, the battery is characterized by the following additional features:

a. metallic rods or tubes are inserted in the channels of the energy storage cells, which are open on both sides, as a tempering mediator.
b. The metallic rods or tubes are coupled to cooling and/or heating media.

In particular, the above features a. and b. are realized together.

The metallic rods or tubes can be used here as heatpipes in the manner already described above, whereby materials with good thermal conductivity are used which can be used in a particularly effective manner for cooling or heating via the interior of the energy storage cells. It is expedient that the metallic rods or tubes are coupled to cooling and/or heating means, for example to cooling elements known per se or similar.

When using a liquid temperature control medium both via the channels of the energy storage cells, which are open on both sides, and, if necessary, via the outer housing shell of the energy storage cells, it is expedient to provide a suitable seal for the energy storage cells, in particular in the lower and upper regions of the cell shell. If necessary, the metal surfaces of the energy storage cells can be sealed, for example by a Teflon coating or similar.

A battery module of the battery may, for example, be constructed in such a way that it comprises at least two battery blocks, each of which comprises a plurality of cylindrical energy storage cells. Within the battery blocks, the energy storage cells may be arranged in corresponding receptacles of a cell holder, for example a plastic cell holder, wherein the longitudinal axes of the cylindrical energy storage cells are parallel to each other. Air passage openings or openings for the passage of another gaseous or a liquid temperature control medium can be provided in the cell holders, so that the temperature control medium can flow through the battery blocks parallel to the longitudinal axes of the energy storage cells. In addition, openings can expediently be provided in the cell holders through which the temperature control medium is passed through the channels of the individual energy storage cells, which are open on both sides.

The battery blocks can be stacked on top of each other with a certain spacing, so that there is a stack gap between adjacent battery blocks in the stack through which the temperature control medium can be passed.

Furthermore, a housing for the battery module is expediently provided, which comprises the stack of battery blocks of the respective battery module. The housing can have an inlet and an outlet for the temperature control medium. In the case of air cooling, for example, an air inlet and an air outlet may be provided. Between the air inlet and the air outlet, an air flow can be generated by means of a fan. In a comparable manner, connections can be provided for a liquid temperature control medium, whereby the temperature control medium is moved with appropriate pumping means.

Manufacturing Process

The present disclosure further provides a method of manufacturing the described energy storage cell. In a first embodiment, this method comprises the following steps:

a. Providing an electrode-separator assembly having at least the anode/separator/cathode sequence and being in the form of a hollow cylindrical winding having two terminal faces and a winding shell therebetween, the electrodes each having a current collector coated with an electrode material and having a first longitudinal edge and a second longitudinal edge, one of the longitudinal edges protruding from one of the terminal faces and the other of the longitudinal edges protruding from the other of the terminal faces,
b. Providing the components of a housing, namely.
   - of a first annular closure member having an outer diameter and an inner diameter,
   - of a second annular closure member having an outer diameter and an inner diameter,
   - of a first tubular housing part having two terminal circular openings, the diameter of the first tubular housing part being matched to the outer diameter of the first annular closure member and the second annular closure member,
   - of a second tubular housing part having two terminal circular openings, the diameter of the second tubular housing part being matched to the inner diameter of the first annular closure member and the second annular closure member,
c. Assembling of the housing and arranging the electrode-separator assembly in the housing,
d. Contacting the electrode-separator assembly with the annular closing elements of the housing, in particular by welding,
e. Closing and/or sealing the housing.

In this first embodiment, arranging the electrode-separator assembly in the housing requires inserting the second tubular housing part into the center of the hollow cylindrical winding, with the winding itself being inserted into the first tubular housing part.

For electrical contacting of the electrodes, the annular closure elements or part of the annular closure elements, for example a contact sheet metal member, are placed on the end faces and connected to them by welding or soldering. Welding can be effected, for example, by means of a laser through the metallic apertured disc of the annular closure element. If necessary, at least one of the closure elements has a pole bushing.

The cell is preferably closed and sealed by welding the edges of the closure elements to the opening edges of the first and second housing parts. For this purpose, the tubular housing parts are preferably metallic.

In a second variation, the method comprises the following steps:

a. Provision of the components of a housing, namely.
   - of a first annular closure member having an outer diameter and an inner diameter,
   - of a second annular closure member having an outer diameter and an inner diameter,
   - of a first tubular housing part having two terminal circular openings, the diameter of the first tubular housing part being matched to the outer diameter of the first annular closure member and the second annular closure member,
   - of a second tubular housing part having two terminal circular openings, the diameter of the second tubular housing part being matched to the inner diameter of the first annular closure member and the second annular closure member, b. Manufacture of an electrode-separator assembly having at least the anode/separator/cathode sequence in the form of a hollow cylindrical winding having two terminal faces and a winding shell located therebetween, the electrodes each having a current collector coated with an electrode material and having a first longitudinal edge and a second longitudinal edge, one of the longitudinal edges protruding from one of the terminal faces and the other of the longitudinal edges protruding from the other of the terminal faces, wherein the electrode-separator assembly is fabricated in the form of the hollow cylindrical winding by winding the electrodes and separator onto the second tubular housing part, c. Assembly of the housing, d. Electrical contacting of the electrode-separator assembly with the annular closing elements of the housing, in particular by welding and e. Closing and/or sealing the housing.

According to this variant, the second tubular housing part of the housing, which has a smaller diameter than the first tubular housing part that ultimately forms the inner shell of the housing, is used as a winding core in the formation of the electrode-separator assembly.

With regard to the electrical contacting of the electrodes and the closing and sealing of the cell, reference is made to the first variant of the method. In this embodiment, too, the tubular housing parts are preferably metallic.

As explained at the beginning, an electrolyte is required for the electrochemical system to function. In principle, liquid and solid electrolytes are possible. Preferably, to introduce a liquid electrolyte, the electrode-separator assembly is impregnated with the electrolyte. In a preferred manner, the impregnation with an electrolyte takes place after the housing has been assembled, whereby the electrolyte can be filled through an opening provided for this purpose, for example in one of the annular closure elements or in another housing part. After the electrolyte has been filled in, the opening is closed, for example by bonding or welding.

The opening can be closed, for example, by welding on a sheet of metal that comprises a bursting diaphragm, bursting cross or similar predetermined rupture point that can rupture at a defined overpressure in the cell to prevent the cell from exploding.

Such a predetermined cracking point can also be located elsewhere, for example in one of the annular closure elements.

FIG. 1 shows an external view of a cylindrical energy storage cell 100. The energy storage cell 100 is realized in the form of a cylindrical round cell. The hollow cylindrical winding with the electrode-separator assembly arranged inside the energy storage cell 100 is not visible. The outer cylindrical housing shell is formed by a first tubular housing part 1030. The upper end face of the energy storage cell 100 is formed by a first annular closure element 1010, the annular closure element being synonymous with the contact element 110. In a corresponding manner, the lower end face is formed with another annular closure element 1020/contact element 110. Inside the energy storage cell 100 is a second (inner) tubular housing part 1040, which defines a channel 1500 open on both sides inside the energy storage cell 100 due to its hollow cylindrical shape.

The first (outer) tubular housing part 1030 is connected in the region from its terminal circular openings to the outer edges of the annular closure elements 1010, 1020 forming the end faces, for example by welding, soldering or bonding. The type of connection also depends on the material from which the tubular housing part 1030 consists of. The inner edges of the annular closure elements 1010, 1020 are connected to the second (inner) tubular housing part 1040 or its terminal circular openings, for example also by welding, soldering or bonding.

Figure 2:
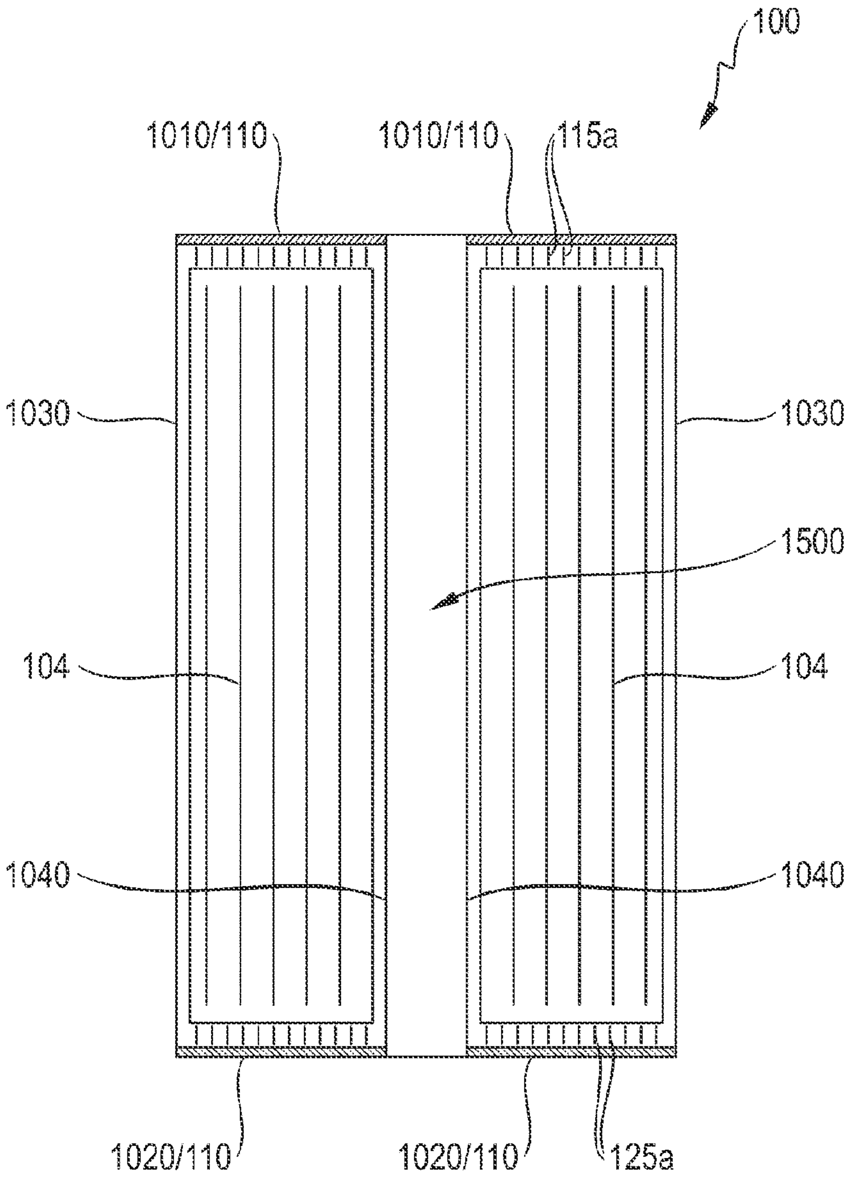
FIG. 2 provides a schematic longitudinal sectional view of an energy storage cell according to an embodiment.

FIG. 2 shows a schematic longitudinal section through a further embodiment of an energy storage cell 100. The hollow-cylindrically shaped electrode-separator assembly 104 is located in the interior space of the energy storage cell 100. It comprises at least one ribbon-shaped anode, at least one ribbon-shaped separator and at least one ribbon-shaped cathode, although not all the individual components of the electrodes are shown here for the sake of clarity. The ribbon-shaped anode is formed by a ribbon-shaped anode current collector coated with negative active material, wherein at least the edge strip 115*a* along a longitudinal edge of the anode current collector is free of active material. The ribbon-shaped cathode is formed by a ribbon-shaped cathode current collector coated with positive active material, at least the edge strip 125*a* along a longitudinal edge of the cathode current collector being free of active material. The edge strip 115*a* of the anode current collector that is free of active material and the edge strip 125*a* of the cathode current collector that is free of active material each protrude from an end face of the cylindrical winding 104.

The outer housing shell is formed by the first tubular housing part 1030. Inwardly, the interior space of the energy storage cell 100 is bounded by the second tubular housing part 1040, defining a channel 1500 in the interior of the energy storage cell 100 that is open on both ends faces of the energy storage cell 100. In this embodiment, the tubular housing parts 1030 and 1040 are formed of an electrically non-conductive plastic. They are connected to the annular closure elements by bonding.

The closure element 1010 also serves as a contact element in the present case and is accordingly also identified by the reference number 110. The electrical contacting of one of the electrodes of the electrode-separator assembly 104 is carried out via this closure element 1010 or contact element 110 in that the longitudinal edge 115*a*, which projects from the wound electrode-separator assembly 104 and is not coated with electrode material, is connected directly to the inside of the annular closure element 1010/contact element 110, preferably by welding or soldering. In a corresponding manner, the bottom-projecting longitudinal edge 125*a* of the other electrode is also directly bonded to the inner side of the annular closure element 1020/contact element 110.

In principle, it is also possible for only one electrode to make direct contact with the annular closure element on one end face of the energy storage cell via its uncoated longitudinal edge, and for the other electrode to make contact with the housing in the conventional manner, for example via an arrester.

The channel 1500 open on both sides inside the energy storage cell 100 enables a particularly effective cooling or temperature control concept for the energy storage cell, since temperature control with a suitable temperature control medium can be performed via the channel 1500 open on both sides and thus the energy storage cell 100 can be reached with the temperature control medium both from the inside and, if necessary, from the outside.

Figure 3:
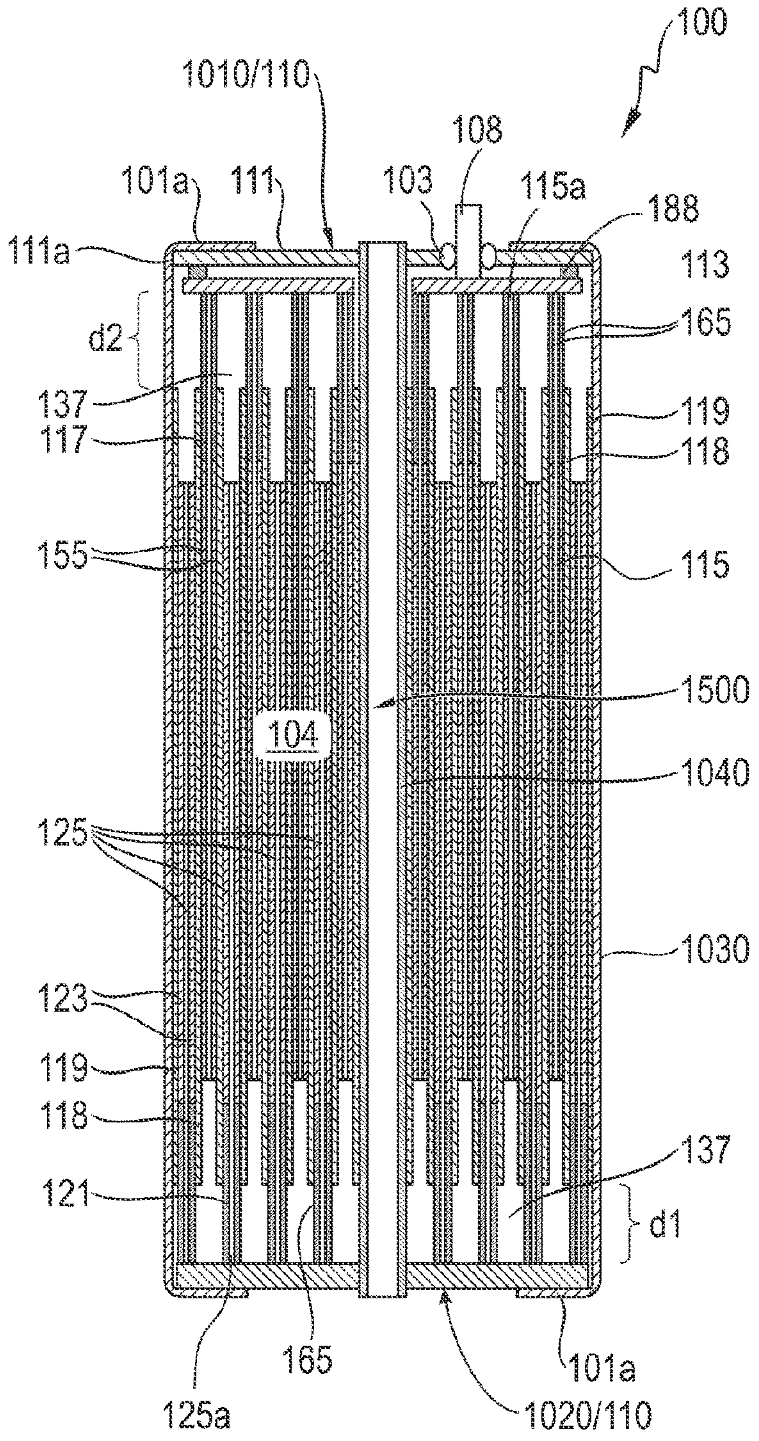
FIG. 3 provides a schematic longitudinal sectional view of an energy storage cell according to an embodiment, showing details of the electrodes.

FIG. 3 illustrates further possible details of the structure of the energy storage cell 100, in particular with regard to the embodiment of the annular closure elements 1010, 1020 and/or the contact elements 110.

The energy storage cell 100 shown in FIG. 3 also has a housing formed by the outer tubular housing part 1030 and the inner tubular housing part 1040 and the annular closure elements 1010, 1020 and the contact elements 110, respectively. The housing includes an interior space 137 in which the electrode-separator assembly 104, formed as a winding, is axially aligned. The second tubular housing part 1040 encloses and defines the channel 1500 of the energy storage cell 100, which is open on both sides.

The annular closure element 1010/110 comprises the apertured metal disk 111 with a circular, outer edge 111*a* and, in addition, the contact sheet metal member 113 and the pole pin 108.

The metallic apertured disc 111 is arranged in such a way that its outer edge 111*a* abuts the inside of the first tubular housing part 1030 along a circumferential contact zone. Its edge 111*a* corresponds to the edge of the annular closure element 1010/110 and is connected to the first tubular housing part 1030 by a circumferential weld seam. In addition, the first tubular housing part 1030 comprises a terminal angled edge 101*a* which is bent radially inwardly (here by about 90°) around the outer edge 11*a* of the metallic apertured disc 111.

The electrode-separator assembly 104 is in the form of a hollow cylindrical winding having two terminal end faces between which extends a circumferential winding shell which abuts the inside of the first tubular housing part 1030. The cavity in the center of the winding is filled by the second housing part. The electrode-separator assembly 104 is formed from a positive electrode and a negative electrode, and separators 118 and 119, each of which is ribbon-shaped and spirally wound. The two end faces of the electrode-separator assembly 104 are formed by the longitudinal edges of the separators 118 and 119. The longitudinal edges of the current collectors 115 and 125 protrude from these end faces. The corresponding protrusions are labeled d1 and d2.

The longitudinal edge of the anode current collector 115 protrudes from the upper end face of the electrode-separator assembly 104, and the longitudinal edge of the cathode current collector 125 protrudes from the lower end face. The anode current collector 115 is loaded in a strip-shaped main region with a layer of a negative electrode material 155. The cathode current collector 125 is loaded in a strip-shaped main region with a layer of a positive electrode material 123. The anode current collector 115 has an edge strip 117 extending along its longitudinal edge 115*a*, which is not loaded with the electrode material 155. Instead, a coating 165 of a ceramic support material is applied here to stabilize the current collector in the range from this region. The cathode current collector 125 has an edge strip 121 extending along its longitudinal edge 125*a*, which is not loaded with the electrode material 123. Instead, the coating 165 of the ceramic support material is applied here as well.

The contact sheet metal member 113 comprises two sides, one of which faces in the direction of the apertured metal disk 111. A plastic spacer 188 is arranged between the metallic apertured disc 111 and the contact sheet metal member 113 to prevent the apertured disc 111 and the contact sheet metal member 113 from touching. On the other side of the contact sheet metal member 113, the longitudinal edge 115*a* is in direct contact with the contact sheet metal member 113 over its entire length and is connected thereto by welding or soldering. The contact sheet metal member 113 has a central aperture through which the housing part 1040 is passed. There is no direct contact between the housing part 1040 and the contact sheet metal member. The closure element 1010 or the contact element 110 serves simultaneously for electrical contacting of the anode and as a housing part.

The pole pin 108 is welded to the contact sheet metal member 113 and extends out of the housing of the energy storage cell 100 through a non central aperture in the apertured metal member 111. The annular closure element 1010 or the contact element 110 further comprises an insulating means 103, which electrically insulates the pole pin 108 and thus also the contact sheet metal member 113 welded to the pole pin 108 from the metallic apertured disc 111. The metallic apertured disk 111 is in turn in direct contact with, and thus in electrical contact with, the outer tubular housing part 1030 and the housing part 1040. The pole pin 108 and the contact sheet metal member 113 are electrically insulated from the outer tubular housing part 1030 and the inner tubular housing part 1040. Both the first and second tubular housing parts 1030 and 1040 are metallic and thus electrically conductive.

The bottom of the energy storage cell 100 is formed by the annular closure element 1020/contact element 110. This is designed as an apertured metal disc, without a pole pin and without a separate contact sheet metal member. The annular closure element 1020/110 is connected to the first tubular housing part 1030 and the housing part 1040 on this side in each case by a circumferential weld seam. Also provided on this side a folded edge 101*a* of the first tubular housing part 1030 of the energy storage cell 100, which surrounds the annular closure element 1020/110.

The longitudinal edge 125*a* of the cathode current collector 125 is in direct contact with the inner side of the annular closure element 1020/110 over its entire length and is connected to it by welding or by soldering. The annular closure element 1020/110 on this side of the energy storage cell 100 thus also serves not only as part of the housing, but also to make electrical contact with the cathode.

Figure 4:
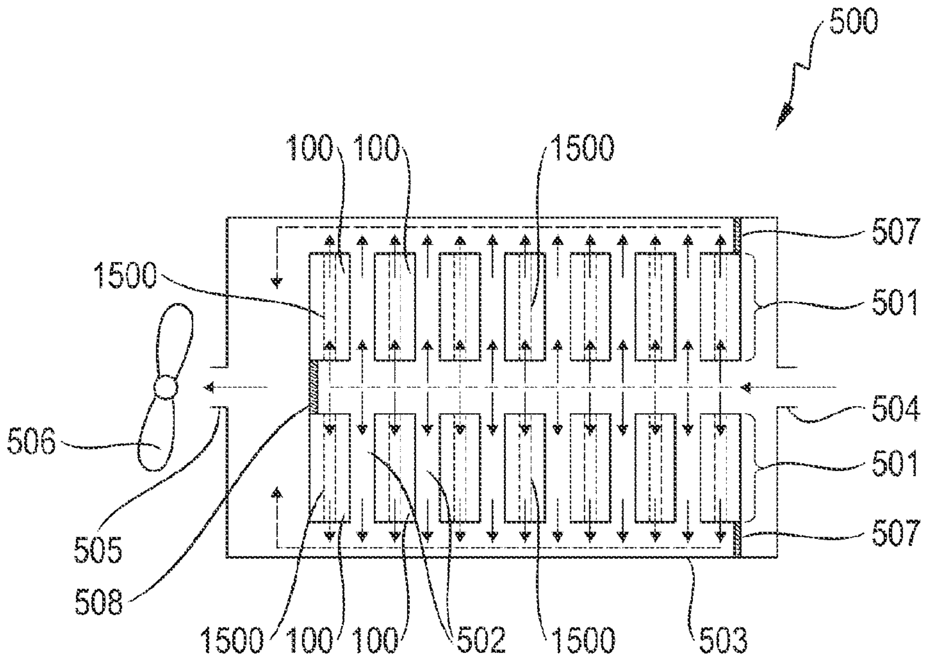
FIG. 4 provides a schematic sectional view of a battery module according to an embodiment.

FIG. 4 shows a schematic sectional view of a battery module 500 for a battery, wherein the battery module 500 comprises a plurality of the energy storage cells 100. Within the battery module 500, the energy storage cells 100 are arranged in two battery blocks 501, each parallel to the other. The cylindrical energy storage cells 100 are arranged in such a way that intermediate spaces 502 are formed between the individual energy storage cells 100, through which a temperature control medium can flow through the battery blocks 501 parallel to the longitudinal axes of the energy storage cells 100. The direction of flow of the temperature control medium is indicated by arrows in this embodiment. The temperature control medium can further flow through the energy storage cells 100 respectively along the channels 1500 open on both sides.

The battery module 500 comprises a housing 503 and elements, not shown in more detail here, for holding and positioning the energy storage cells 100 within the housing 503. These elements may, in particular, be so-called cell holders made of plastic, which form the individual cell blocks 501 and which position and hold the energy storage cells 100 in a suitable manner in the manner of a frame with corresponding receptacles. These elements for holding the energy storage cells 100 are set up in such a way that the temperature control medium can flow both through the gaps 502 between the individual energy storage cells 100 and through channels 1500 inside the energy storage cells 100, which are open on both sides in each case.

Two or more of such battery modules 500 can form a battery. Such a modular structure of a battery is particularly advantageous, since individual battery modules can be exchanged and/or replaced if necessary, and that with the modular structure the respective battery can be flexibly assembled and constructed according to the respective requirements.

In the example of a battery module 500 shown in FIG. 4, air cooling is indicated, with the flow of air shown by the arrows. In an analogous manner, another temperature control medium, for example a liquid temperature control medium, could also be used, which is moved by suitable pumping means or suction means.

The housing 503 comprises an inlet 504 for the temperature control medium, for example for air, and an outlet 505 for the temperature control medium, in particular for the air. In this example, the air flow is driven by a fan 506 arranged at the outlet 505.

Suitable steering means 507 and 508 or sealing means (sealing means 507 between the battery blocks and the inner housing wall in the region of the inlet 504 and sealing means 508 between the two battery blocks in the region of the outlet 505) guide the temperature control medium in such a way that it is first directed via the inlet 504 into an intermediate space between the two battery blocks 501. From this intermediate space, the temperature control medium passes through the battery blocks 501, flowing on the one hand through the intermediate spaces 502 between the individual energy storage cells 100 and on the other hand through the individual energy storage cells 100 along the channels 1500 open on both sides. After flowing through the battery blocks 501, the temperature control medium is directed in the direction of the outlet 505 in an intermediate space between the respective battery blocks 501 and the housing wall.

In the battery blocks 501 shown here in section, the energy storage cells 100 are preferably arranged in a regular pattern in a plurality of rows. For example, sixteen rows of twelve cylindrical energy storage cells 100 each may be provided in a battery block 501. The cells 100 in each row may be arranged in the same orientation. Offset from this, twelve energy storage cells 100 may also be arranged in the adjacent row, but with reversed polarity. In each case, a serial interconnection of sixteen energy storage cells 100 across the rows may be provided in a zigzag pattern.

With the energy storage cells 100 in such an arrangement, a cooling or temperature control concept can be realized in which the individual energy storage cells can be flowed through with the temperature control medium not only from the outside, but also from the inside. This means that energy storage cells with a relatively large diameter, for example with a diameter of 25 mm or larger, in particular of 30 mm or larger, can be very effectively tempered and in particular cooled, so that battery modules and batteries with altogether larger and therefore more powerful energy storage cells can be realized.

Figure 5:
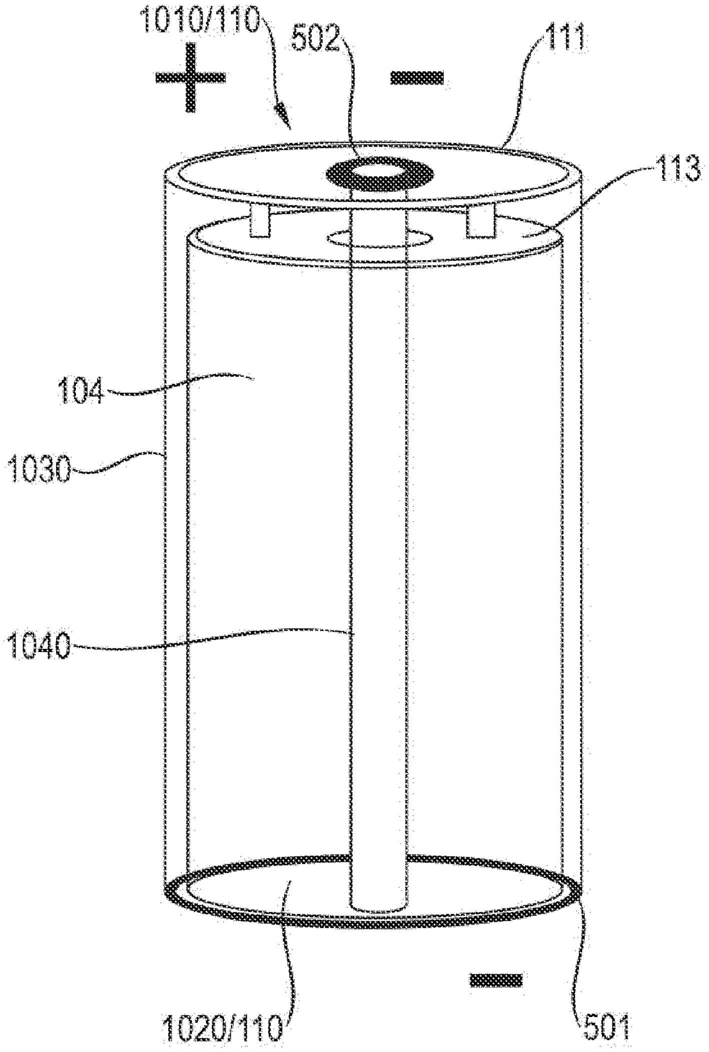
FIG. 5 provides a schematic side view of a further embodiment of an energy storage cell.

FIG. 5 shows a schematic view of a further embodiment of the energy storage cell 100, which is implemented in the form of a cylindrical round cell. Inside the energy storage cell 100, the electrode-separator assembly 104 formed as a hollow cylindrical winding is arranged. Analogous to the other embodiments explained, in particular to the embodiment shown in FIG. 3, the electrode-separator assembly 104 comprises at least one ribbon-shaped anode, at least one ribbon-shaped separator and at least one ribbon-shaped cathode, the electrodes and their components not being shown here for the sake of clarity. The ribbon-shaped anode is formed by a ribbon-shaped anode current collector coated with negative active material, wherein a marginal strip along a longitudinal edge of the anode current collector is free of active material. The ribbon-shaped cathode is formed by a ribbon-shaped cathode current collector coated with positive active material, wherein an edge strip along a longitudinal edge of the cathode current collector is free of active material. The edge strip of the anode current collector, which is free of active material, and the edge strip of the cathode current collector, which is free of active material, each protrude from an end face of the cylindrical winding 104.

The outer, cylindrical housing shell of the cell 100 is formed by a first tubular housing part 1030. The upper end face of the energy storage cell 100 is formed by a first annular closure element 1010, the annular closure element being synonymous with the contact element 110. In a corresponding manner, the lower end face is formed with another annular closure element 1020/contact element 110. The closure element 1010/110 is made up of two parts and comprises an apertured disc 111, which bounds the end face outwardly, and a contact sheet metal member 113, which is arranged below the apertured disc 111 and has a central recess.

The uncoated longitudinal edge of the cathode current collector, which protrudes from the wound electrode-separator assembly 104 on this side, is contacted on the lower side of the contact sheet metal member 113. Preferably, the longitudinal edge is connected there by welding or soldering. The contact sheet metal member 113 is in turn electrically connected to the apertured disc 111 via two electrical conductors. The apertured disc 111 is electrically insulated from the second (inner) tubular housing part 1040, which is formed by a metallic tube, by the electrically insulating sealing means 502. Its outer edge, on the other hand, is welded or soldered to the circumferential opening edge of the housing part 1030.

The electrode-separator assembly 104 is directly wound on the tubular member 1040. In this example, the anode current collector is preferably electrically and directly connected to the second tubular housing part 1040. In addition, the uncoated longitudinal edge of the anode current collector protruding from the wound electrode-separator assembly 104 at the lower side is directly tied to the annular closure element 1020/110 forming the lower end face of the cell 100. Preferably, there is also a welded or soldered connection here.

The lower annular closure element 1020/110 is electrically insulated from the first (outer) tubular housing part 1040 by an electrically insulating seal 501, so that the lower end face of the cell 100 forms part of the negative pole of the cell 100. The other portion of the negative pole is formed by the tubular member 1040 extending to the upper end face of the cell. An embodiment with reversed polarization is of course also possible.

In a variation of the illustrated cell, the contact sheet metal member 113 and correspondingly the conductors between the contact sheet metal member 113 and the apertured disc 111 may also be omitted. The uncoated longitudinal edge of the cathode, which protrudes from the top of the wound electrode-separator assembly 104, is then directly connected to the lower side of the apertured disc 111, preferably by welding or soldering.

To facilitate contacting of the negative terminal on the upper end face of the cell 100, it may be provided that the metallic tube forming the second (inner) tubular housing part 1040 protrudes slightly from the upper end face of the cell 100, for example by 2-3 mm.

This embodiment of the energy storage cell 100 has the particular advantage that both the negative and the positive potential of the cell can be tapped on one side of the cell, in this example on the upper end face. Likewise, it is possible for the cell 100 to be electrically contacted in a conventional manner via the opposite end faces. At the same time, a cooling concept according to the above description can be realized via the central channel formed by the second (inner) tubular housing part.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An energy storage cell designed as a cylindrical round cell with an outer diameter of at least 30 mm, the energy storage cell comprising:

an electrode-separator assembly in the form of a hollow cylindrical winding with two terminal end faces and a winding shell therebetween, the electrode-separator assembly comprising:

a ribbon-shaped anode comprising a ribbon-shaped anode current collector having a first longitudinal edge, a second longitudinal edge, a strip-shaped main region loaded with a layer of negative electrode material, and a free edge strip extending along the first longitudinal edge that is not loaded with the negative electrode material, a ribbon-shaped cathode comprising a ribbon-shaped cathode current collector having a first longitudinal edge, a second longitudinal edge, a strip-shaped main region loaded with a layer of positive electrode material, and a free edge strip extending along the first longitudinal edge that is not loaded with the positive electrode material, and a separator; and a housing enclosing a hollow cylindrical interior space in which the electrode-separator assembly is axially aligned, the housing comprising:

a first annular closure member having an outer diameter and an inner diameter, a second annular closure member having an outer diameter and an inner diameter, a first tubular housing part having two terminal circular openings, a diameter of the first tubular housing part being matched to the outer diameters of the first annular closure member and the second annular closure member, a second tubular housing part having two terminal circular openings, the diameter of the second tubular housing part being matched to the inner diameters of the first annular closure member and the second annular closure member, wherein an at least partially metallic contact element is in direct contact with a respective longitudinal edge, wherein the respective longitudinal edge is the first longitudinal edge of the ribbon-shaped anode current collector or the first longitudinal edge of the ribbon-shaped cathode current collector, wherein the ribbon-shaped anode and the ribbon-shaped cathode are formed and/or arranged within the electrode-separator assembly relative to each other such that the first longitudinal edge of the ribbon-shaped anode current collector protrudes from one of the two terminal end faces and the first longitudinal edge of the ribbon-shaped cathode current collector protrudes from the other of the terminal faces; and wherein the first or the second annular closure member is configured as the at least partially metallic contact element, and wherein the second tubular housing part defines a channel open at both ends and extending axially through the energy storage cell.

2. The energy storage cell of claim 1, wherein the channel is configured for temperature control of the energy storage cell.

3. The energy storage cell of claim 1, wherein the channel is provided for flow of a temperature control medium, in particular a gas or a liquid.

4. The energy storage cell according to claim 1, further comprising:

a metallic rod or tube is inserted into the channel as a tempering agent.

5. The energy storage cell according to claim 1, wherein the energy storage cell is a cylindrical round cell.

6. The energy storage cell according to claim 1, wherein the cylindrical energy storage cell has an outer diameter of at least 32 mm.

7. The energy storage cell according to claim 1, wherein the energy storage cell is a lithium-ion cell.

8. A battery, comprising:

at least two energy storage cells according to claim 1, and a device for temperature control of the energy storage cells via the channels of the at least two energy storage cells.

9. The battery of claim 8, wherein the energy storage cells are arranged within battery modules that are interconnected to form the battery.

10. The battery of claim 8, wherein the device for temperature control of the energy storage cells comprises a port for introducing a temperature control medium into the channels of the energy storage cells.

11. The battery of claim 8, wherein:

the device for temperature control of the energy storage cells comprises a port for driving a gaseous temperature control medium, and/or the device for temperature control of the energy storage cells comprises a port for directing a gaseous tempering medium through the channels of the energy storage cells.

12. The battery of claim 8, wherein at least one of:

the device for temperature control of the energy storage cells comprises a pump configured to move a liquid temperature control medium, and/or the device for temperature control of the energy storage cell comprises a pump configured to direct a liquid temperature control medium through the channels of the energy storage cells.

13. The battery according to claim 8, further comprising:

metal rods or tubes inserted into the channels of the energy storage cells as a temperature control agent, wherein the metallic rods or tubes are coupled to cooling and/or heating media.

14. A method of manufacturing an energy storage cell according to claim 1, the method comprising:

providing the electrode-separator assembly, providing the first annular closure member, the second annular closure member, the first tubular housing part, and the second tubular housing part, assembling the housing under arrangement of the electrode-separator assembly in the housing, electrically contacting of the electrode-separator assembly with the first annular closure member and the second annular closure member, and closing and/or sealing the housing.

15. A method of manufacturing an energy storage cell according to claim 1, the method comprising:

providing the first annular closure member, the second annular closure member, the first tubular housing part, and the second tubular housing part, producing the electrode-separator assembly in the form of the hollow cylindrical winding by winding the ribbon-shaped anode current collector, the ribbon-shaped cathode current collector, and the separator onto the second tubular housing part, assembling the housing, electrically contacting the electrode-separator assembly with the first annular closure member and the second annular closure member, and closing and/or sealing the housing.

* * * * *